US012541765B2

(12) United States Patent
Kannaiyan

(10) Patent No.: US 12,541,765 B2
(45) Date of Patent: Feb. 3, 2026

(54) SYSTEMS AND METHODS FOR AN AI-DRIVEN BLOCKCHAIN PROTOCOL COORDINATING INCENTIVIZED, RISK-AWARE AUTONOMOUS OPERATIONAL AGENTS FOR DYNAMIC RISK/RETURN MANAGEMENT OF TOKENIZED ASSETS

(71) Applicant: RMINT Inc, Cary, NC (US)

(72) Inventor: Balaji Kannaiyan, Cary, NC (US)

(73) Assignee: RMINT INC, Cary, NC (US)

( * ) Notice: Subject to any disclaimer, the term of this patent is extended or adjusted under 35 U.S.C. 154(b) by 0 days.

(21) Appl. No.: 19/201,998

(22) Filed: May 8, 2025

(65) Prior Publication Data

US 2025/0278728 A1    Sep. 4, 2025

Related U.S. Application Data

(63) Continuation-in-part of application No. 18/116,881, filed on Mar. 3, 2023.

(60) Provisional application No. 63/648,669, filed on May 17, 2024, provisional application No. 63/648,672, filed on May 17, 2024, provisional application No. 63/648,673, filed on May 17, 2024, provisional application No. 63/643,942, filed on May 8, 2024.

(51) Int. Cl.
*G06Q 20/40* (2012.01)
*G06Q 20/38* (2012.01)

(52) U.S. Cl.
CPC ......... *G06Q 20/401* (2013.01); *G06Q 20/389* (2013.01)

(58) Field of Classification Search
USPC ........................................... 705/75
See application file for complete search history.

(56) References Cited

U.S. PATENT DOCUMENTS

2021/0209688 A1*  7/2021  Krishnamurthy et al.
2021/0367762 A1* 11/2021  Bae et al.
2022/0343331 A1* 10/2022  Shannon et al.

* cited by examiner

*Primary Examiner* — Neha Patel
*Assistant Examiner* — Yin Y Choi
(74) *Attorney, Agent, or Firm* — Dhiraj Jindal; PATENT YOGI LLC

(57) ABSTRACT

An AI-driven blockchain protocol provides systems/methods for managing tokenized assets via autonomous operational Risk-Aware Agents (RAAs). Distinct from prior art automating simple events, the protocol actively coordinates, incentivizes, and manages the RAAs' on-chain lifecycle and operational/financial performance metrics using an Agent Coordination Contract/Module. Verifiable on-chain incentives link RAA operational performance, tracked by said metrics, to risk/return outcomes, thereby underwriting operational execution. An AI engine analyzes aggregated data including RAA metrics, recommending adjustments to RAA incentives and/or metric targets managed by the protocol. RAAs execute operations driven by these incentives, using a protocol-native stablecoin for reward/penalty settlement. A continuous feedback loop enables optimization. This verifiable autonomous operational management provides a foundation for stablecoin-based leverage against the assets, addressing illiquidity. The system comprises interconnected contracts, processor, engine, and RAAs under protocol governance.

18 Claims, 4 Drawing Sheets

SYSTEMS AND METHODS FOR AN AI-DRIVEN BLOCKCHAIN PROTOCOL COORDINATING INCENTIVIZED, RISK-AWARE AUTONOMOUS OPERATIONAL AGENTS FOR DYNAMIC RISK/RETURN MANAGEMENT OF TOKENIZED ASSETS

REFERENCE TO RELATED APPLICATIONS

The present application claims the benefit of a) U.S. provisional patent application No. 63/643,942, filed on May 8, 2024, titled "SYSTEMS AND METHODS FOR COMPREHENSIVE BLOCKCHAIN-BASED FINANCIAL INTEGRATION WITH STABLECOIN ENHANCEMENT FOR HOSPITALITY INDUSTRY", b) U.S. provisional patent application No. 63/648,669, filed on May 17, 2024, titled "SYSTEMS AND METHODS FOR RAPID RESTAURANT DEPLOYMENT WITH STABLECOIN INTEGRATION", c) U.S. provisional patent application No. 63/648,672, filed on May 17, 2024, titled "SYSTEMS AND METHODS FOR ESTABLISHING A CO-OWNERSHIP AND PROFIT-SHARING MODEL IN A RESTAURANT BUSINESS", and d) U.S. provisional patent application No. 63/648,673, filed on May 17, 2024, titled "SYSTEMS AND METHODS FOR PROVIDING SECURITY TOKEN FRAMEWORKS FOR REAL-WORLD ASSETS IN HOSPITALITY SECTOR WITH STABLECOIN BENEFITS", each of which is incorporated herein in its entirety.

This application is a continuation in part of U.S. patent application Ser. No. 18/116,881, titled "SYSTEMS AND METHODS OF PERSONALIZING SERVICES ASSOCIATED WITH RESTAURANTS FOR PROVIDING A MARKETPLACE FOR FACILITATING TRANSACTIONS", filed Mar. 3, 2023, which is incorporated by reference herein in its entirety.

FIELD OF THE INVENTION

Embodiments of the present invention relate generally to the field of financial technology, blockchain applications, artificial intelligence (AI) in asset management, and digital asset lifecycle management. M ore particularly, embodiments relate to AI-driven blockchain protocols specifically designed to coordinate incentivized Risk-Aware Agents (RAAs) for the continuous management of risk and return associated with tokenized assets, wherein said agents autonomously manage operations translating into measurable on-chain financial metrics.

BACKGROUND OF THE INVENTION

Traditional asset management, particularly for complex ventures or real-world assets, suffers from numerous limitations including manual processes, opacity, latency, and significant intermediary costs. Risk management often relies on periodic human analysis, lacking the continuous adaptability required for volatile markets or dynamic operational environments. Fractional ownership remains cumbersome, hindering liquidity and investor access.

Furthermore, specific industries like hospitality (e.g., restaurants) face high entry barriers due to substantial capital requirements for tangible assets (property, equipment), complex deployment processes (site selection, leasing, staffing), and challenging financing environments. Traditional funding routes like bank loans often have stringent requirements, while equity investment may involve loss of control. Existing ownership models (partnerships, LLCs) can lack transparency and efficient mechanisms for profit distribution, especially dynamic adjustments based on real-time performance.

While blockchain technology offers potential through tokenization and smart contracts, existing applications remain insufficient for realizing true autonomous asset management focused on continuous risk/return optimization. Many (representing prior art in basic tokenization) provide only static representations of ownership or basic transfer functionalities. They fail to address the core challenges of integrating dynamic valuation, real-world operational management, and achieving genuine asset liquidity beyond simple trading. Crucially, they lack protocols specifically architected to enable, coordinate, and manage a system of autonomous AI agents tasked with this continuous management. Prior art often focuses on using blockchain to automate or make verifiable processes related to time/value of money/assets. They do not address the challenge of a protocol actively managing the operational execution strategy of autonomous agents based on dynamic risk/return goals.

Existing approaches combining AI and blockchain typically utilize AI/ML primarily for off-chain analysis, prediction, or triggering predefined on-chain actions. They generally do not disclose protocols featuring specific on-chain incentive structures designed to directly motivate sophisticated Risk-Aware Agent (RAA) actions-including planning, coordination, and execution of operational tasks-based on achieving dynamic risk/return objectives defined by the protocol itself. Mechanisms for protocol-governed, RAA-driven autonomous custody, the integral use of protocol-native stablecoins by RAAs for operational transactions and incentive settlement, verifiable coordination of RAAs for planning and executing tasks impacting asset value, the maintenance of verifiable on-chain RAA performance metrics, and on-chain management of the agent lifecycle are largely absent.

Similarly, protocols developed for Decentralized Autonomous Organizations (DAOs) or basic multi-agent system (MAS) coordination on blockchain may automate simple tasks or facilitate agent discovery/communication, but typically focus on governance voting or basic bot execution. They lack the framework for the blockchain protocol itself to actively manage the ongoing operational strategy and execution quality of specialized Risk-Aware Agents (RAAs) using dynamic, performance-based, on-chain financial incentives directly tied to risk and return. The vital feedback loop—whereby the protocol enables RAAs through risk/return incentives, RAAs plan and execute operations, verifiable performance metrics are recorded on-chain, this performance data feeds back influencing AI analysis, and that analysis refines protocol strategy and on-chain RAA incentives controlling how agents operate—is not realized.

Existing off-chain AI management systems may perform complex analysis or planning but lack the crucial blockchain protocol layer for verifiable coordination, trustless incentive alignment between the protocol and its autonomous Risk-Aware Agents (RAAs) regarding operational performance impacting risk/return, immutable recording of RAA operational and financial performance metrics against specific incentives, and autonomous financial settlement tied directly to the risk/return optimization process achieved through agent actions. Crucially, they lack a framework to verifiably underwrite the operational risks associated with complex ventures using autonomous execution. They cannot provide a unified system where Risk-Aware Agents (RAAs) autonomously manage operations and assets specifically to optimize a risk/return profile defined, enforced, and effectively underwritten by the blockchain protocol itself, thereby failing to establish the trusted operational foundation needed to unlock verifiable value and liquidity potential from traditionally opaque and illiquid assets.

Therefore, there is a significant need for a novel blockchain-based protocol designed not merely to automate time/money events, but to create and manage an ecosystem where the protocol itself directs the operational behavior of autonomous Risk-Aware Agents (RAAs) toward continuous risk/return optimization, thereby enabling the underwriting of operational performance through verifiable autonomous management. This operational underwriting is fundamental to establishing the collateral integrity required to unlock liquidity and enable leverage against these assets. This protocol must provide the framework for: tokenizing assets; assigning specialized Risk-Aware Agents (RAAs) capable of planning, coordinating, and executing complex operational tasks and managing their associated financial representations on-chain; defining verifiable on-chain incentive structures directly linked to risk/return metrics that govern how agents operate; facilitating coordination between AI engines (co-pilots) and operational RAAs via smart contracts; managing the RAA lifecycle and associated operational/financial performance metrics on-chain; enabling protocol-governed, RAA-driven custody for operational purposes; utilizing protocol-native tokens (including a stablecoin whose issuance for leverage relies on the value accrued and stabilized through underwritten operations); embedding compliance; automating financial events reflecting the outcomes of the RAA-driven operations and their translation into financial metrics; and maintaining an immutable record of the entire protocol-agent interaction loop. This system aims to provide verifiable, protocol-underwritten autonomous operational management focused on risk/return, thereby unlocking dead capital and enhancing efficiency.

SUMMARY OF THE INVENTION

Embodiments provide systems and methods for a comprehensive, AI-driven blockchain protocol architected to enable, coordinate, incentivize, and manage the on-chain lifecycle and performance metrics of autonomous Risk-Aware Agents (RAAs) capable of planning, coordinating, and executing operational tasks for the continuous management of risk and return associated with tokenized assets, effectively underwriting the operational performance through its autonomous control system. This verifiable operational management provides the foundation for unlocking the dead capital associated with such assets, enabling leverage through mechanisms like protocol-native stablecoin issuance against the reliably managed underlying value. Distinctly from prior art focused on automating time-based events or simple financial transactions, this protocol focuses on the continuous management of risk and return by actively directing the operational execution of assigned RAAs through verifiable on-chain incentives. The protocol utilizes AI engines for analysis (potentially setting underwriting criteria via recommended incentives/targets) and relies on RAAs-whose lifecycle, operational/financial metrics, and incentives are managed on-chain via an Agent Coordination Contract/Module motivated by these incentives, to autonomously perform operations impacting risk/return and update associated on-chain financial state representations (proxies for balance sheet/cash flow items). Agent actions are driven primarily by the protocol's incentive structure, mediating a continuous feedback loop where validated, on-chain RAA performance metrics influence AI analysis, which refines protocol-managed incentives that enforce the underwriting parameters, all recorded immutably while enforcing compliance.

In one aspect, a method involves: receiving configuration data including RAA incentive rules linked to risk/return operational performance metrics; deploying contracts including the Agent Coordination Contract configured to store and update RAA lifecycle status and performance metrics; assigning RAAs and initiating their lifecycle; ingesting data; analyzing data and evaluating RAA operational performance against incentives using stored metrics; transmitting instructions/results; validating (incl. RAA status/metrics check); initiating autonomous actions based on validated inputs; exercising RAA custody; calculating entitlements based partly on validated RAA performance metrics; and automatically transferring stablecoins for settlements and RAA rewards/penalties based on validated performance metrics, potentially updating RAA lifecycle status and metrics on the Agent Coordination Contract.

The protocol enables verifiable autonomous management where Risk-Aware Agents (RAAs), coordinated by the Agent Coordination Contract and motivated by on-chain incentives, execute operational tasks aimed at optimizing risk/return and managing associated on-chain financial representations. RAA performance feeds back into AI engine analysis, informing adjustments to RAA incentive parameters and metrics targets managed on-chain, creating the vital risk/return optimization feedback loop. Protocol-RAA operational interactions, lifecycle events, and metric updates are immutably recorded.

In another aspect, a system comprises: a blockchain; smart contract modules including the core Agent Coordination Module (managing RAA lifecycle, metrics, incentives, validation); a processor; an AI engine; assigned, incentivized Risk-Aware Agents (RAAs) configured for scoped operational planning, execution, management of related financial metrics, and reporting against protocol incentives; wherein components interact under protocol governance for risk/return management, including on-chain management of RAAs, their operations, and their impact on financial metrics, utilizing the stablecoin for incentive settlement, enforcing compliance, and recording activities.

Specific mechanisms highlighting the solution include: protocol-native tokens; a stablecoin used by RAAs for internal settlements and enabling leverage against the operationally underwritten asset value; RAA-driven custody under protocol authorization; verifiable RAA operational execution driven by on-chain incentives tied to on-chain metrics; blockchain recording of RAA lifecycle and performance; a protocol-mediated feedback loop utilizing RAA metrics; event-triggered settlement reflecting outcomes of RAA management; and on-chain management of RAA lifecycle and performance metrics.

By architecting the protocol to manage autonomous Risk-Aware Agent (RAA) operations via on-chain risk/return incentives, verifiable performance metrics, and lifecycle control, enabling these agents to link operational execution to on-chain financial state representations and enabling the underwriting of operational risk through verifiable autonomous execution, the invention provides advantages in verifiable autonomous operational optimization, dynamic value representation, unlocking liquidity via stablecoin leverage founded on reliable RAA-managed operations, efficiency, transparency, security, performance-based control enabling underwriting, and enabling novel investment/management models.

DETAILED DESCRIPTION OF THE INVENTION

I. Introduction

Figure 1:
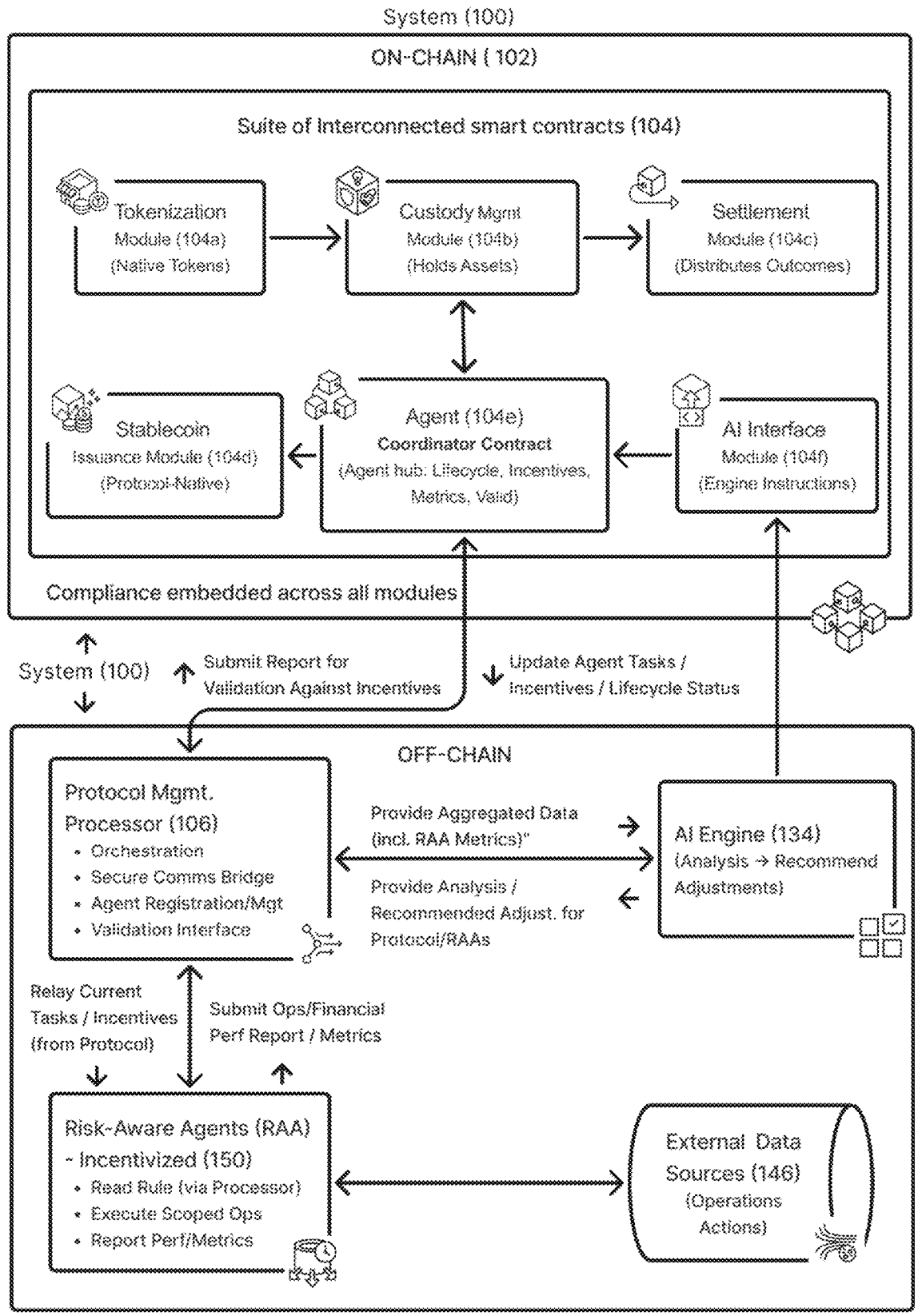
FIG. 1 is a block diagram illustrating an exemplary system architecture implementing the protocol, emphasizing the interactions enabling protocol-managed autonomous Risk-Aware Agent (RAA) operations, including the Agent Coordination Contract (104*e*) managing RAA lifecycle, incentives, and storing/updating on-chain performance metrics within the suite of interconnected smart contracts (104); the figure also depicts off-chain components including the Protocol Management Processor (106), AI Engine (134), assigned RAAs (150), and their interaction with External Data Sources/Operational Environments (146).

The present invention discloses a blockchain protocol, and associated systems and methods, specifically architected to enable, coordinate, incentivize, and manage the lifecycle of autonomous operational Risk-Aware Agents (RAAs) dedicated to the continuous optimization of risk and return for tokenized assets. The protocol distinguishes itself from the prior art, often limited to automating time or basic financial events, by establishing a framework where AI engines provide strategic analysis to set operational risk/return parameters, but day-to-day operational execution is driven by assigned RAAs explicitly motivated by verifiable, on-chain incentives tied to risk/return outcomes, with performance tracked by on-chain metrics, all managed by the protocol itself, allowing the protocol to effectively underwrite the operational execution within defined boundaries. This synergistic integration utilizes interconnected smart contracts deployed on a suitable blockchain network, utilizes protocol-native token structures including a stablecoin functioning as the operational currency for RAAs and as a mechanism for providing leverage against the managed assets, enables RAA-driven autonomous custody within protocol-defined boundaries, embeds compliance logic, and automates the full financial and operational lifecycle based on verifiable RAA operational performance metrics. This provides not only dynamic optimization and transparency but also a crucial solution to the illiquidity or "dead capital" problem typical of such investments, by establishing a trustworthy operational foundation managed by RAAs that supports leverage.

II. Core Concepts and Definitions

Protocol: Rules, interfaces, and smart contracts defining the operational environment for autonomous Risk-Aware Agents (RAAs), including on-chain lifecycle status management, scope, risk/return-linked incentives, performance metric definitions and validation processes, coordination, and reward/penalty distribution. These rules collectively define the parameters under which the protocol underwrites the autonomous operational performance of its RAAs.

AI Engine: Analytical component assessing risk/return, evaluating RAA operational effectiveness based on reported metrics, and generating instructions primarily to adjust protocol parameters or refine RAA tasks, performance metric targets, and incentive structures via the protocol interface. Its analytical capabilities typically derive from machine learning models developed using standard training and evaluation methodologies. Acts potentially as a strategic co-pilot.

Risk-Aware Agent (RAA): Refers to an autonomous or semi-autonomous software entity whose operational capabilities are typically developed through machine learning training and validated through evaluation. Each RAA is registered with and managed by the protocol via the A gent Coordination Contract/Module (104*e*). Operates within protocol-defined scope and on-chain lifecycle status, motivated by explicit on-chain risk/return incentives. Internally, may comprise sophisticated AI architectures including perception modules, memory, internal world models (representing operational dynamics and their linkage to key financial indicators like inventory, supply chain, demand, pricing, human factors, and economic indicators), and adaptive reasoning capabilities (planning algorithms, chain-of-thought) for determining action sequences by reasoning over world models to optimize performance against protocol incentives. Configured to perform assigned operational tasks (operating in inference mode) including planning, coordination, execution, and potentially managing specific financial processes by updating designated on-chain metrics representing balance sheet or cash flow elements within its scope. Analyze local risk/return impact using internal models, and report results including relevant operational and financial performance metrics. Its actions are steered by the protocol's incentives designed to optimize operational execution and associated financial outcomes according to a defined risk profile, potentially enabling adaptation based on rewards/penalties.

Tokenized Asset (Native Asset Token): Protocol-specific digital representation managed via the Tokenization Module (104*a*). Value influenced by operational actions of assigned RAAs. Governed by embedded protocol rules.

Custody (RAA-Driven Autonomous): Protocol-delegated control over assets held within the Custody Management Module (104*b*). Exercised by RAAs via validated authorizations mediated by the Agent Coordination Module (104*e*), respecting on-chain RAA lifecycle status and operational limits.

Protocol-Native Stablecoin: Protocol-managed stablecoin issued by the Stablecoin Issuance Module (104*d*). Stability relies critically on the perceived and actual value of Native Asset Tokens used as collateral. The protocol's active management and underwriting of operational performance underlying these assets (via AI/RAA coordination, tracked by on-chain metrics) aims to stabilize and enhance collateral value. The assessed risk profile associated with the specific RAAs managing the underlying assets may influence stablecoin issuance parameters, linking leverage directly to the quality of operational underwriting. Serves as primary transactional currency for internal operations, distributing financial outcomes (yield/interest via Settlement Module 104c), and settling performance-based rewards/penalties for RAAs via Agent Coordination Module (104e) based on validated metrics.

Agent Coordination Contract/Module (104e): The central on-chain hub managing the protocol-RAA relationship: registration, lifecycle status, scope, enforceable risk/return incentives, storage/update of key operational/financial performance metrics associated with each RAA's activity, report validation against rules/metrics, reward/penalty distribution (stablecoin), and mediation of authorized RAA interactions. Acts as the core enforcement mechanism for the protocol's operational underwriting.

Incentive Structures/Rules: Explicit, on-chain rules within the Agent Coordination Module (104e) defining operational performance metrics (tracked on-chain) and corresponding stablecoin rewards/penalties for associated RAAs. The protocol's primary mechanism for directing autonomous RAA operational behavior towards desired risk/return outcomes that meet the protocol's underwriting standards.

III. System Architecture (Ref FIG. 1)

An exemplary System (100), illustrated conceptually in FIG. 1, comprises On-Chain (102) and Off-Chain components. The On-Chain environment on the Blockchain Network (102) hosts the Suite of Interconnected Smart Contracts (104). This suite includes a Tokenization Module (104a) managing Native Tokens, a Custody Management Module (104b) holding assets and executing authorized transactions, a Settlement Module (104c) distributing financial outcomes, a Stablecoin Issuance Module (104d) managing the protocol-native stablecoin, the central Agent Coordination Contract/Module (104e) managing RAA lifecycle, scope, incentives, metrics, and validation, and an AI Interface Module (104f) receiving instructions from the off-chain AI Engine (134). Compliance logic is embedded across these modules (104). Interactions with the Off-Chain environment are mediated by the Protocol Management Processor (106). The Processor manages configuration, orchestrates communication, registers/manages RAAs and their metric initializations via the Agent Coordination Module (104e), validates RAA reports containing metric data before submitting them to the Agent Coordination Module (104e), and relays current tasks/incentives/targets from the protocol to the RAAs (150). The AI Engine (134) performs holistic analysis based on aggregated data including on-chain RAA metrics, generating recommendations potentially including adjustments to RAA incentives or performance metric targets. The Assigned, Incentivized Risk-Aware Agents (RAAs) (150) operate off-chain, reading tasks/incentives/targets from the Agent Coordination Module (104e) via the Processor (106), executing scoped operational actions potentially interacting with External Data Sources/Operational Environments (146), analyzing their impact, and reporting performance including metrics back to the Processor (106). This architecture facilitates the protocol's active management of RAA operations and measurable performance for risk/return optimization, with activities immutably recorded.

IV. Core Protocol Method (Ref FIG. 2)

Figure 2:
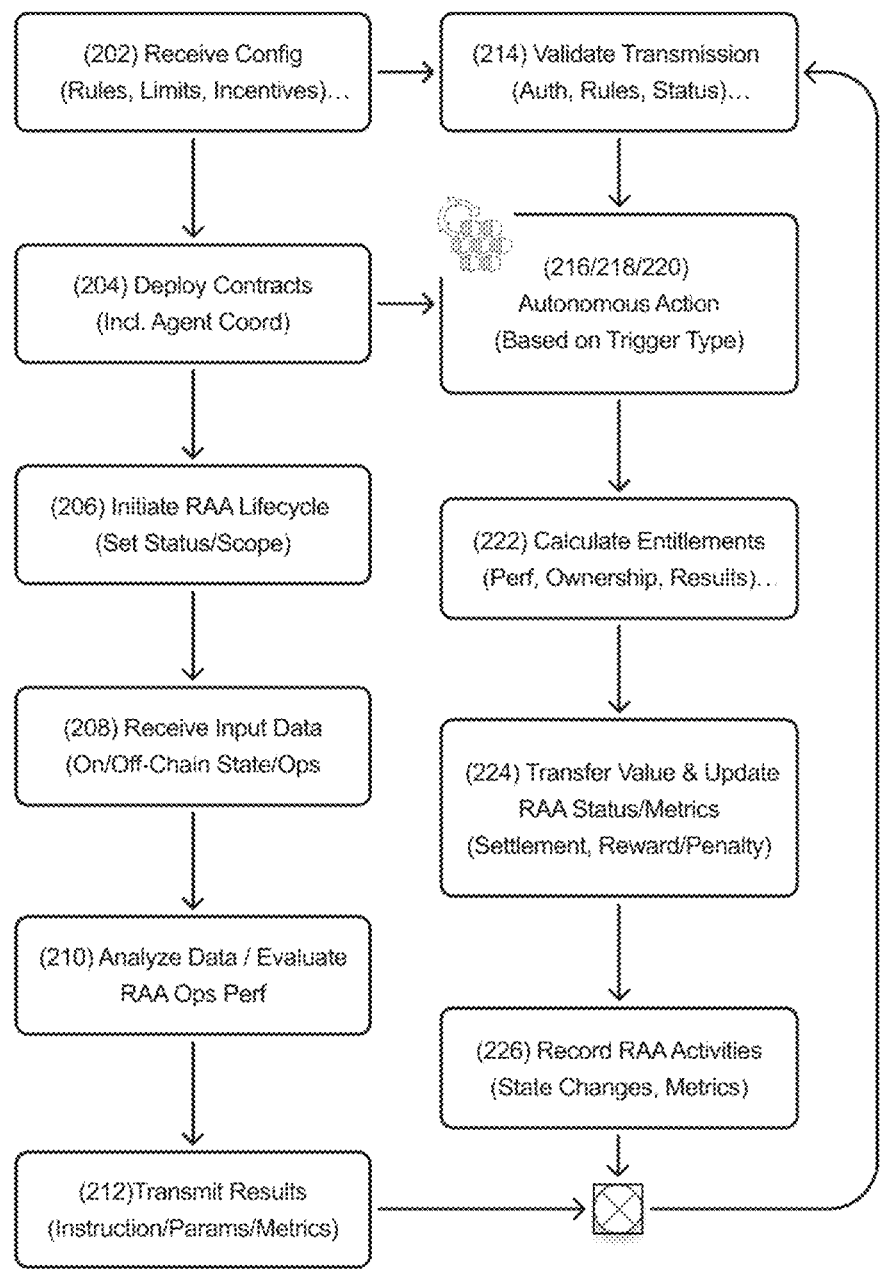
FIG. 2 is a flowchart illustrating the core method steps for initiating the protocol and managing RAA registration/lifecycle and metric initialization within its framework, showing the continuous operational loop where RAA performance metrics are evaluated and updated, aligning with the primary independent method claim.

The core method, illustrated conceptually in FIG. 2 aligning with claim 1, establishes the protocol framework including agent metric management. (202) Receive Configuration includes rules, operational limits, RAA scope, lifecycle, performance metrics definitions, and risk/return incentives. (204) Deploy/Configure Smart Contracts includes the Agent Coordination Contract (104e) with logic for lifecycle, metrics, and incentives. (206) Initiate RAA Lifecycle & Metrics sets initial status, scope, and initializes performance metrics in the Agent Coordination Contract (104e). (208) Receive Input Data includes current on-chain RAA metrics. (210) Analyze Data & Evaluate RAA Performance evaluates RAA operational performance against incentives using stored metrics. (212) Transmit Instructions/Parameters/Performance Results include relevant metric data. (214) Validate Transmission checks authenticity, rules, RAA status, and potentially metric thresholds via the relevant smart contract module (often 104e). (216/218/220) Initiate Autonomous Action based on the validated trigger. (222) Calculate Entitlements informed by validated RAA performance metrics. (224) Transfer Value executes settlements/RAA rewards/penalties based on validated metrics, and updates RAA status and associated metrics on the Agent Coordination Contract (104e). (226) Record Activities include RAA status updates and incentive payouts. The loop returns to (208).

V. Blockchain Recording and Agent Lifecycle/Incentive Example (Ref FIG. 3)

Figure 3:
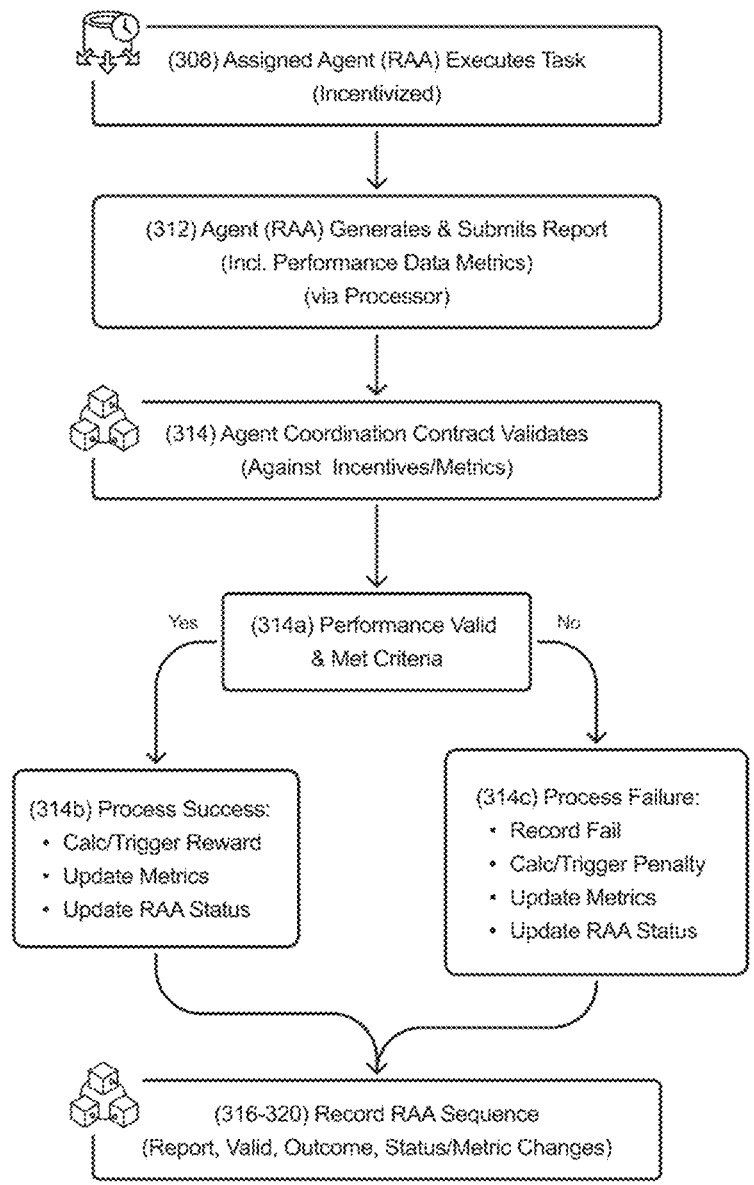
FIG. 3 is a flowchart detailing a specific example of RAA operational reporting, protocol validation against on-chain incentives using performance metrics, and consequent reward/penalty status and metric updates, illustrating the protocol's enforcement mechanism for RAA operations.

FIG. 3 provides a granular example incorporating on-chain RAA metrics. (308) An Assigned RAA Executes an Operational Task, driven by on-chain incentives and aiming for metric targets defined in the Agent Coordination Contract (104e). (312) The RAA Submits a Report including performance data corresponding to defined metrics. (314) The Agent Coordination Contract (104e) validates this report against incentive rules and compares reported data to metric targets/thresholds. If successful (314b), the contract (104e) calculates/triggers a stablecoin reward based on metric achievement, updates relevant RAA performance metrics on-chain positively, and may update status. If unsuccessful (314c), it processes failure, potentially triggers a stablecoin penalty, updates metrics negatively or as failure, and may update lifecycle status negatively. (316-320) The entire sequence—RAA action report, validation result, reward/penalty, resulting RAA status, and metric changes—is recorded immutably.

VI. Holistic AI-Driven Risk/Return Management Cycle (Ref FIG. 4)

Figure 4:
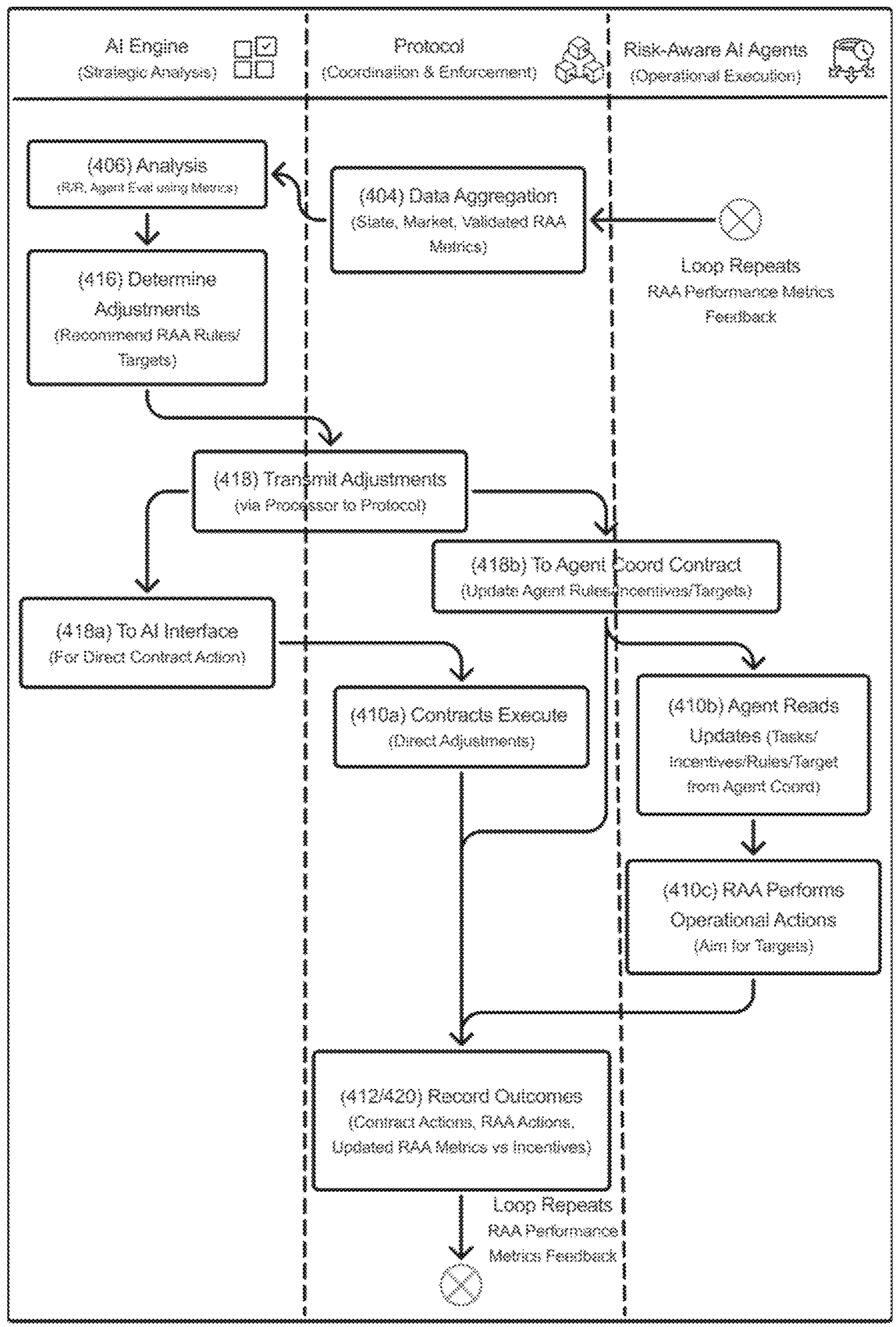
FIG. 4 is a swimlane flowchart illustrating the Holistic AI-driven Risk/Return Management Cycle, visually separating roles (AI Engine analysis, Protocol coordination, RAA operational execution) and showing the continuous feedback loop where protocol-managed incentives and metric targets guide RAA operations, RAA performance metrics feed back into AI analysis, and analysis informs incentive/task/metric target adjustments.

FIG. 4 (swimlane view) details the continuous optimization cycle incorporating metrics. Protocol lane: (404) Aggregates data including validated RAA operational/financial metrics and validated reports. AI Engine lane: (406) Analyzes data, and evaluates RAA performance using current metrics against incentives. (416) Determines adjustments, potentially recommending changes to RAA tasks, incentives, scope, lifecycle rules, or metric targets managed by the protocol. Protocol lane: (418) Receives adjustments.

Instructions may trigger (410a) Direct Contract Actions or (418b) update the Agent Coordination Contract (104e) with new RAA directives including metric targets. Risk-Aware Agents (RAAs) lane: (410b) RAAs read updated directives including targets from the Agent Coordination Contract (104e). (410c) RAAs perform operational actions aiming for metric targets. Performance (including metrics) is reported back. Protocol lane: (412/420) Records outcomes including updated RAA performance metrics. This Performance Metrics Feedback closes the loop to (404), enabling the protocol to continuously refine RAA operational strategy via on-chain incentives based on AI analysis.

VII. Specific Implementations and Features

Protocol-Native Tokens and Stablecoin: The protocol manages Native Asset Tokens via the Tokenization Module (104a). The Protocol-Native Stablecoin issued by the Stablecoin Issuance Module (104d) acts as the intra-protocol currency facilitating RAA operations and settling performance-based incentives via the Agent Coordination Module (104e) or Settlement Module (104c). Stability mechanisms might involve dynamic adjustment of collateralization ratios or fees, based on the operational outcomes reported by the autonomous RAAs (including their performance metrics) and the analysis performed by the AI engine (134).

Embedded Compliance: Involves implementing logic within the Tokenization (104a) and A gent Coordination (104e) modules. Examples include checks against on-chain registries, enforcing jurisdictional restrictions, or implementing compliance logic mapped from relevant financial regulations, such as those promulgated by the SEC or other authorities, to govern specific token functionalities and potentially certain types of RAA-initiated actions within the protocol's ruleset.

Autonomous Asset/Strategy Adjustments: Direct adjustments by contracts (triggered by AI Engine (134) via AI Interface Module 104f) complement adjusting RAA operational behavior via incentives managed by the Agent Coordination Module (104e). This could involve interacting with integrated DeFi protocols or modifying operational contract parameters.

Risk-Aware Agent (RAA) Autonomous Custody: Protocol delegates custody authority to RAAs. Agent Coordination Module (104e) acts as a gatekeeper for the Custody Module (104b), granting permissions based on RAA on-chain status, scope, and potentially metrics. Allowed actions might include RAAs utilizing tokens for operational needs like acquiring inputs, transferring value according to validated results, depositing assets into protocol-managed vaults, providing tokens as collateral for protocol-native stablecoin issuance where authorized, or participating in protocol-internal lending mechanisms for yield generation. Authorization may require multi-factor authorization (MFA) or multi-party computation (MPC) schemes potentially involving cryptographic checks by the protocol itself or requiring consensus from other designated RAAs managing the specific asset for critical operations.

Risk-Aware Agent (RAA) Operational Planning & Execution: Internally, RAAs (150) may employ various AI techniques, including reinforcement learning, planning algorithms, or expert systems, to determine optimal actions based on their assigned tasks and current incentive structure retrieved from the protocol. Each unique RAA utilizes its own cryptographic signature authority, such as a securely managed private key, to authenticate its communications and reported results submitted to the protocol via the processor (106). Validation by the Agent Coordination Module (104e) relies on verifying these digital signatures alongside evaluating the submitted performance data against incentive rules and stored metrics. An RAA's scope could explicitly include managing certain financial contracts represented as smart contracts or tracked states within the protocol; for example, autonomously triggering pre-approved supplier payments upon validated goods receipt (impacting COGS metrics), requesting stablecoin drawdowns from a protocol vault based on demonstrating positive working capital metrics according to its world model, or executing actions designed to optimize an on-chain representation of a simplified operational balance sheet (e.g., minimizing waste metrics, maximizing asset utilization metrics).

Blockchain Recording of Agent Lifecycle and Metrics: Agent Coordination Module (104e) maintains state variables for RAA status (Pending, Active, Suspended_Penalty, Suspended_Manual, Terminated states). It also maintains key operational and financial performance metrics associated with each RAA's activity, updated based on validated reports. These on-chain metrics form a core part of the RAA's managed state, influence incentive calculations, and serve as input for AI Engine (134) analysis.

Holistic Management Cycle: Data aggregation involves integrating on-chain data, oracle feeds, on-chain RAA metrics (from 104e), and relevant offline operational data derived from RAA (150) activities potentially involving external sources (146). The AI engine (134) uses this comprehensive dataset for modeling, simulation, and optimization of overall strategy and RAA directives, including performance metric targets updated via the Agent Coordination Module (104e).

Automated Distribution & Settlement: Implementation may involve protocol-native endpoints managing interactions with tokens/vaults. Trigger events initiate processes within the Settlement Module (104c) reflecting outcomes of AI-managed, RAA-driven operational performance. Off-chain event validation relies on verifiable digital signatures or potentially multiple independent oracle sources before settlement actions are executed.

VIII. Enablement Details

Implementation of the described systems and methods requires the integration of expertise and potentially specialized components across blockchain engineering, artificial intelligence, secure systems design, and potentially specific domain knowledge related to the assets being managed. While standard tools form a basis, realizing the invention necessitates addressing specific technical challenges beyond generic implementation, sufficient to teach a Person Having Ordinary Skill In The Art (PHOSITA) how to make and use the invention without undue experimentation. These challenges and enablement considerations include the following:

Sophisticated Smart Contract Logic (A gent Coordination): The Agent Coordination Module (104e) demands non-trivial smart contract development beyond typical token contracts. Its logic must handle complex state management for potentially numerous RAAs, including implementing on-chain lifecycle state machines (managing transitions between states like Active, Suspended based on performance), defining and utilizing secure storage/update mechanisms (e.g., mappings, structs, arrays) for diverse operational and financial performance metrics associated with each RAA, implementing potentially complex, multi-factor incentive calculation logic based on validated metrics against configurable rules (curves, thresholds), implementing robust validation logic for agent reports (potentially checking data consistency, sequence, or cryptographic proofs), and implementing secure mediation logic for authorization requests to other modules (like Custody Module 104b) based on RAA status, scope, and metrics. This requires expertise in advanced Solidity or similar smart contract language development and gas optimization techniques.

Secure and Verifiable Protocol-Agent Communication: Establishing secure, reliable, and verifiable communication channels between potentially numerous off-chain RAAs (150) and the on-chain Agent Coordination Module (104e), typically via the Processor (106), is critical. This involves not only standard secure transport (e.g., TLS, authenticated A Pls) but potentially mechanisms for ensuring the integrity and authenticity of RAA-reported operational data and performance metrics submitted for on-chain validation. Solutions may involve RAAs cryptographically signing reports using unique, securely managed keys (potentially via hardware security modules or secure enclaves), potentially incorporating zero-knowledge proofs (e.g., zk-SNARKs) or other verifiable computation techniques for complex off-chain actions where direct verification is infeasible, or utilizing consensus mechanisms among specific RAA groups for critical data reporting, ensuring the data used for on-chain incentive calculation is trustworthy. The Processor (106) must be configured to handle these verification steps before relaying data on-chain.

AI Model Development and Integration: Developing functional AI Engines (134) and RAAs (150) requires standard AI/M L practices but tailored to the protocol's specific needs. The AI Engine needs models (e.g., predictive, optimization, simulation models) capable of analyzing the specific on-chain RAA metrics and protocol state provided via the Processor (106) to generate meaningful recommendations for adjusting on-chain incentive parameters or metric targets within the Agent Coordination Module (104e). RAAs (150) require internal models (e.g., world models representing operational dynamics, potentially using techniques like reinforcement learning, planning algorithms, Bayesian networks, or expert systems) specifically designed to perceive their environment (via data inputs), reason about actions, and optimize behavior based on the dynamic, on-chain incentive structures provided by the protocol (retrieved via Processor 106). This necessitates co-design of AI agent capabilities and protocol incentive mechanisms, along with expertise in training, evaluation, deployment (inference), and potentially continuous refinement (MLOps) of these models within the integrated system.

Processor Orchestration and Security: The Protocol Management Processor (106) requires robust software architecture (e.g., microservices, event-driven) for orchestration, managing asynchronous communication, potentially handle large volumes of agent reports, performing initial validation/formatting, securely managing credentials for blockchain interaction, and reliably transmitting authenticated instructions/data between the AI Engine (134), RAAs (150), and on-chain modules (104). High availability, fault tolerance, and security against external attacks are critical design considerations.

On-Chain Data Management: Efficiently storing and updating potentially granular RAA status and performance metric data within the Agent Coordination Module (104e) requires careful smart contract design considering blockchain state size limitations and transaction costs (gas). Optimized data structures (e.g., packed structs, efficient mapping patterns) and judicious use of event emission for indexing and enabling off-chain monitoring (via Processor 106 or external indexers) are necessary implementation details.

Incentive Mechanism Design: Crafting the specific on-chain incentive rules within the Agent Coordination Module (104e)—defining metrics, targets, reward curves, penalty functions—requires careful economic modeling and potentially game-theoretic analysis to ensure they effectively align sophisticated RAA behavior with desired risk/return objectives without creating unintended consequences or exploitable loopholes. This design process is a key aspect of configuring the protocol via the configuration data received by the Processor (106).

Integration with External Systems: Enabling RAAs (150) to interact effectively with external data sources or operational environments (146) requires developing or utilizing secure and reliable interfaces (e.g., standardized A Pls, IoT protocols, data adapters). Ensuring the integrity of data received from, and the security of commands sent to, these external systems is part of the overall system enablement.

Addressing these specific technical requirements, involving the described components (102, 104a-f, 106, 134, 150, 146) and their interactions as illustrated in FIGS. 1-4, enables a PHOSITA to make and use the claimed invention without undue experimentation, demonstrating that the invention comprises concrete technical solutions beyond abstract ideas or generic computer implementations.

IX. Novelty and Non-Obviousness

The invention's novelty and non-obviousness arise primarily from the protocol's specific architecture and integrated mechanisms designed to actively manage autonomous Risk-Aware Agent (RAA) operations via on-chain rules for continuous risk/return optimization, specifically enabling the protocol to underwrite operational performance and leverage this underwriting to solve asset illiquidity, distinguishing it significantly from prior art:

a. Shift from Time/Money Automation to Protocol-Managed Risk-Aware Agent Operations: Protocol manages the 'how' and 'how well' of complex RAA operational behavior via dynamic incentives.
 b. Protocol-Centric RAA Coordination, Risk/Return Incentivization, Metric Tracking, & Lifecycle Management: Agent Coordination Module (104e) as an on-chain hub managing RAA scope, lifecycle status, verifiable risk/return incentives, operational/financial performance metrics, validation, and reward/penalty distribution.
 c. Synergistic AI Engine (Co-Pilot) & Incentivized RAA Operational Loop for Underwriting: Protocol-mediated continuous feedback loop where analysis influences on-chain RAA incentives/tasks and performance metric targets managed by Agent Coordination Module (104e).
 d. Integrated Protocol-Native Stablecoin Specifically for RAA Operational Incentive Settlement Based on Metrics.
 e. Protocol-Delegated RAA-Driven Autonomous Custody (Lifecycle/Metric-Aware): Custody control under protocol rules considering RAA on-chain lifecycle status and potentially metrics stored in Agent Coordination Module (104e).
 f. Full Lifecycle Autonomous Operational & Financial Management Enabling Underwritten Leverage: Integrated system where the protocol directs/verifies operational performance of its lifecycle-managed RAAs via on-chain incentives and metrics, using this verified operational stability as the basis for enabling stablecoin-based leverage.

X. Broader Applicability

While exemplified by complex ventures, the protocol's core functionalities-enabling AI analysis to guide protocol-coordinated, incentivized, lifecycle-managed autonomous Risk-Aware Agent (RAA) execution for operational management informed by on-chain metrics, risk/return optimization, RAA-managed custody, automated financial operations, and the verifiable underwriting of complex autonomous processes-offer a powerful framework applicable to diverse tokenized assets requiring dynamic, verifiable autonomous management.

What is claimed is:

1. A method for autonomously managing risk and return associated with tokenized assets using an Artificial Intelligence-driven (AI-driven) blockchain protocol, Artificial Intelligence (AI) engines, assigned, incentivized autonomous operational Risk-Aware Agents (RAAs) whose lifecycle and performance metrics are managed on-chain by the protocol, and a protocol-native stablecoin, the method comprising:

1(a) receiving, by at least one processor, configuration data specifying asset rules, operational limits and constraints, agent scope parameters, agent lifecycle management parameters defining potential lifecycle statuses and transitions, agent associations specifying relationships between agents or the agents and assets, definitions for operational and financial performance metrics associated with an agent activity including potential performance thresholds or targets, agent incentive rules explicitly linking rewards or penalties to said performance metrics impacting risk and return, and parameters related to agent cryptographic authentication;

1(b) deploying, by the at least one processor, interconnected smart contracts onto a blockchain network, said contracts including at least one of a custody contract, an AI interface contract, a settlement contract, a stablecoin issuance contract for said protocol-native stablecoin, a protocol-controlled tokenization smart contract configured to generate native asset tokens, and an agent coordination contract configured to store said agent incentive rules, said agent associations, said operational limits and constraints, manage agent lifecycle status according to said lifecycle management parameters, and store and update said operational and financial performance metrics for assigned RAAs;

1(c) initiating and managing the lifecycle of specific RAAs within the protocol by assigning, via said processor updating said agent coordination contract, said RAAs to a venture or said tokenized assets according to said agent associations, setting an initial lifecycle status based on said lifecycle management parameters, defining their operational scope according to said agent scope parameters, and initializing their associated performance metrics within said agent coordination contract;

1(d) receiving input data comprising on-chain state including current on-chain RAA performance metrics and RAA lifecycle status stored by said agent coordination contract, and relevant off-chain market or operational data;

1(e) analyzing, by said AI engines and/or said assigned RAAs, said input data to determine executable instructions or parameters aimed at managing risk and return within said specified operational limits and constraints, and evaluating RAA operational performance against said stored incentive rules using said stored performance metrics;

1(f) transmitting, by said processor, said determined instructions, said parameters, or validated RAA operational performance results, including updated metric values, with cryptographic authentication according to said authentication parameters to at least one of said interconnected smart contracts;

1(g) validating, by the smart contract receiving the transmission according to step 1(f), verification of associated digital signatures for cryptographic authenticity, compliance with stored operational rules, compliance with said metric thresholds or targets where applicable, and the current RAA on-chain lifecycle status stored by said agent coordination contract;

1(h) initiating, via one or more of said interconnected smart contracts, an autonomous action modifying a state of said tokenized assets or an operational state of said venture, said action triggered by a condition selected from the group consisting of: (i) validated instructions from said AI engine for strategic adjustments, and (ii) validated operational action results submitted by an assigned RAA demonstrating operational performance, reflected in said updated metric values, relative to the stored risk/return incentive rules enforced by said agent coordination contract;

1(i) determining, for a plurality of token holders, specific transfer amounts of said protocol-native stablecoins based on a combination of said validated risk-aware autonomous agents' operational performance metrics and ownership records associated with said native asset tokens; and 1(j) automatically transferring, via a pathway selected from the group consisting of: said settlement contract, and said agent coordination contract, said protocol-native stablecoin to entitled parties, including transferring specified rewards or penalties to said assigned RAAs based on the validated operational performance metrics against the stored incentive rules, wherein the agent coordination contract autonomously updates the RAA's on-chain lifecycle status and associated performance metrics based on said performance and/or said lifecycle management parameters.

2. The method of claim 1, wherein managing said tokenized assets is facilitated by integrated protocol-native token structures comprising:

2(a) wherein said native asset tokens are generated via a protocol-controlled tokenization smart contract included in said interconnected smart contracts, representing value related to said venture whose risk/return profile is managed by the assigned RAAs' operations as measured by said on-chain performance metrics, governed by protocol rules including embedded compliance checks;

2(b) issuing said protocol-native stablecoin via said dedicated stablecoin issuance smart contract, wherein said stablecoin serves as the primary medium utilized by said assigned RAAs and said agent coordination contract for executing operational value transfers and settling said rewards or penalties based on said validated operational performance metrics against said incentives; and 2(c) enforcing said embedded compliance checks within said protocol rules governing transactions, including operational transactions initiated autonomously by said assigned RAAs based on said protocol incentives and said performance metrics.

3. The method of claim 2, wherein the autonomous action initiated in steps 1(h) and 1(i) implements protocol-level strategic adjustments via said interconnected smart contracts performing on-chain operations comprising at least one of: executing a token swap; transferring assets between custody addresses managed by said custody contract; updating an operational smart contract parameter; or minting or burning said native asset tokens generated according to claim 2, complementing, adjustments achieved through said incentivized RAA operations aimed at optimizing said performance metrics.

4. The method of claim 1, further comprising enabling said assigned RAAs to exercise autonomous custody control over associated assets managed by said custody contract for operational purposes by:
   4(a) delegating, via said agent coordination contract based on said configuration data, specific transaction authorization capabilities exclusively to the assigned RAA;
   4(b) configuring said custody contract to execute transactions upon receiving validated authorization mediated through said agent coordination contract, said authorization contingent upon the RAA's current on-chain lifecycle status and assigned operational scope stored within said agent coordination contract, and potentially current standing based on said stored performance metrics; and
   4(c) allowing the assigned RAA to autonomously initiate and authorize operational transactions modifying asset state within said custody contract, wherein said initiation and said authorization are driven by the RAA seeking to optimize performance against the stored risk/return incentive structures as reflected in said target performance metrics defined in said configuration data, while adhering to said protocol rules and operational limits and constraints.

5. The method of claim 1, further comprising enabling autonomous operational management via said assigned RAAs planning, coordinating, and executing tasks based on said on-chain incentives managed by said agent coordination contract, said management comprising the steps of:
   5(a) storing operational tasks, goals, or schedules, and corresponding said incentive rules linking rewards or penalties to said target operational performance metrics impacting risk and return, within the agent coordination contract;
   5(b) detecting, by an assigned RAA, a relevant operational task or goal from said agent coordination contract;
   5(c) planning, coordinating, and performing, by the assigned RAA acting in accordance with said stored incentive rules to achieve said target performance metrics, an off-chain computation or operational action sequence;
   5(d) generating, by the assigned RAA, a report containing results and operational performance data values corresponding to said defined metrics relative to the specific incentive rules for the completed task;
   5(e) transmitting said report via said processor to the agent coordination contract; and
   5(f) validating, by the agent coordination contract, the report against the stored incentive rules; determining the corresponding reward or penalty based on validated performance data compared to said target metrics; triggering the transfer of said reward or penalty using the protocol-native stablecoin via the agent coordination contract; and updating the RAA's stored performance metrics on the agent coordination contract based on the validated report.

6. The method of claim 1, further comprising maintaining an immutable record on said blockchain network encompassing key events in the assigned RAA's lifecycle and performance as managed on-chain by the agent coordination contract, including said initial assignment, lifecycle status transitions comprising becoming Active, Suspended, or Terminated, scope updates, said submitted operational reports, performance validations against said incentives, updates to said stored operational and financial performance metrics, and executed said reward or penalty transactions, providing a verifiable audit trail.

7. The method of claim 1, wherein autonomously managing risk and return is achieved through a continuous cycle comprising:
   7(a) continuously aggregating data streams including said on-chain state, market conditions, and said validated operational performance metrics stored on-chain for assigned RAAs;
   7(b) performing integrated analysis by said AI engine, synthesizing said aggregated data to assess overall risk/return profile and evaluate RAA operational actions against said configured limits and constraints and on-chain risk/return incentive rules utilizing said RAA performance metrics;
   7(c) determining optimal adjustments by said AI engine, identifying modifications to financial strategy or operational parameters, specifically by recommending changes comprising at least one of: tasks, scope, lifecycle status rules, performance metric targets, or risk/return incentive rules stored in said agent coordination contract for said assigned RAAs;
   7(d) generating and transmitting targeted instructions via said processor, said instructions directed to a target selected from the group consisting of: (i) initiate direct execution by specific ones of said interconnected smart contracts, and (ii) update said on-chain agent operational directives within the agent coordination contract, including tasks, scope, status, metric targets, or incentives;
   7(e) executing said determined adjustments autonomously based on the transmitted instructions by either: (i) said specific smart contracts performing direct execution, or (ii) said assigned RAAs adapting their operational behavior according to said updated operational directives retrieved from the agent coordination contract to meet potentially revised metric targets, utilizing said protocol-native stablecoin for associated transfers; and
   7(f) recording outcomes, wherein said recorded RAA operational performance data, including said updated metrics, feeds back into the data aggregation step of step 7(a) of this claim for subsequent analysis cycles.

8. The method of claim 1, wherein the determination of specific transfer amounts in step 1(i) and the automatic transfer in step 1(j) are applied to implement automated distribution of returns reflecting outcomes of AI-guided, RAA-driven operations as measured by said performance metrics, said distribution initiated upon detection of a trigger event comprising at least one of an on-chain condition met or a validated off-chain event, determining distributable returns, identifying entitlement holders based on said ownership records, and autonomously transferring specified return amounts using said protocol-native stablecoin.

9. The method of claim 1, wherein the determination of specific transfer amounts in step 1(i) and the automatic transfer in step 1(j) are applied to implement autonomous settlement of fractional stakes, said settlement initiated upon detection of a settlement trigger comprising at least one of a predefined on-chain condition met, a validated off-chain lifecycle event, or an on-chain event triggered by said AI engine based on operational assessment, reading token holder balances associated with said native asset tokens, calculating pro-rata settlement values based on ownership stake and trigger rules reflecting the state resulting from said protocol and RAA management including final RAA performance metrics, and autonomously transferring calculated settlement values using said protocol-native stablecoin.

10. A system for autonomously managing risk and return associated with tokenized assets, implementing an Artificial Intelligence-driven (AI-driven) blockchain protocol utilizing Artificial Intelligence (AI) engines and assigned, incentivized autonomous operational Risk-Aware Agents (RAAs) whose lifecycle and performance metrics are managed on-chain by the protocol, the system comprising:

10(a) a blockchain network;
10(b) interconnected smart contract modules deployed on said blockchain network, including at least one of a custody module, an AI interface module, a settlement module, a stablecoin issuance module configured to issue a protocol-native stablecoin, a tokenization module configured to generate native asset tokens, and an agent coordination module configured to store agent incentive rules explicitly linking rewards or penalties to operational performance metrics impacting risk and return, agent associations, operational limits and constraints, manage agent lifecycle status data on-chain, and store and update said operational and financial performance metrics for assigned RAAs;
10(c) at least one processor communicatively coupled to the blockchain network and said smart contract modules, configured to: receive configuration data specifying asset rules, operational limits and constraints, agent scope parameters, agent lifecycle management parameters defining potential lifecycle statuses and transitions, performance metric definitions including potential performance thresholds or targets, said agent incentive rules, said agent associations, and parameters related to agent cryptographic authentication; deploy said smart contract modules; initiate and manage the lifecycle and metric initialization of specific RAAs within the protocol by assigning said RAAs via the agent coordination module according to said agent associations and setting initial lifecycle status and scope; receive input data including current on-chain RAA performance metrics and RAA lifecycle status stored by said agent coordination module; interface with an AI engine and said assigned RAAs; transmit determined instructions, parameters, or validated RAA operational performance results including updated metric values with cryptographic authentication according to said authentication parameters to appropriate ones of said smart contract modules; and provide an interface for submitting RAA operational reports containing metric data to the agent coordination module for validation;
10(d) the AI engine communicatively coupled to the processor, configured to analyze said input data to determine executable instructions or parameters aimed at optimizing risk/return within said specified operational limits and constraints, evaluate RAA operational performance against said stored incentive rules using said stored performance metrics, and determine adjustments including changes to RAA operational tasks, metric targets, and/or incentives communicated via said processor to the agent coordination module;
10(e) said assigned, incentivized autonomous operational RAAs, associated via the agent coordination module, configured to: retrieve operational tasks, risk/return incentives, and associated performance metric targets from the agent coordination module via the processor; perform scoped operational actions adhering to said operational limits and constraints, wherein said actions include planning, coordinating, and executing off-chain computations or operational sequences; generate operational performance results or reports containing performance data corresponding to said defined metrics relative to said specific incentive rules; and transmit said reports to the processor for submission to the agent coordination module; and
10(f) wherein said smart contract modules are configured to: validate transmissions received from the processor, including verification of associated digital signatures for cryptographic authenticity, compliance with stored operational rules, compliance with said metric thresholds or targets where applicable, and the current RAA on-chain lifecycle status stored by said agent coordination module; initiate autonomous actions modifying a state of said tokenized assets or an operational state based on said validated inputs, said actions triggered by a condition selected from the group consisting of: (i) validated instructions from the AI engine for strategic adjustments, and (ii) validated operational action results submitted by an assigned RAA demonstrating operational performance reflected in said performance metrics relative to said incentives; determine, for a plurality of token holders, specific transfer amounts of said protocol-native stablecoins based on a combination of said validated risk-aware autonomous agents' operational performance metrics and ownership records associated with said native asset tokens; and automatically transfer said protocol-native stablecoins via a pathway selected from the group consisting of: the settlement module, and the agent coordination module to entitled parties, including transferring specified rewards or penalties to said assigned RAAs based on the validated RAA operational performance metrics against said stored incentive rules, wherein the agent coordination module autonomously updates the RAA's on-chain lifecycle status and associated performance metrics based on said performance and/or said lifecycle management parameters.

11. The system of claim 10, wherein said smart contract modules further include:

11(a) said tokenization module configured to generate native asset tokens representing value whose risk/return profile is managed by said assigned RAAs' operations as measured by said on-chain performance metrics, governed by protocol rules including embedded compliance checks; and
11(b) said dedicated stablecoin issuance module issuing said protocol-native stablecoin utilized by said assigned RAAs and said agent coordination module for settling said rewards or penalties based on said validated operational performance metrics against said incentives;

11(c) wherein said embedded compliance checks are enforced governing transactions initiated autonomously by said assigned RAAs based on said incentives and performance metrics.

12. The system of claim 10, wherein said smart contract modules are further configured to implement protocol-level strategic adjustments responsive to said validated instructions received via the AI interface module according to trigger (i) of configuration 10(f), said adjustments comprising performing on-chain operations including at least one of: executing a token swap; transferring assets between custody module addresses; updating an operational smart contract parameter; or minting or burning said native asset tokens, complementing adjustments achieved through said incentivized RAA operations aimed at optimizing said performance metrics.

13. The system of claim 10, further configured to enable said assigned RAAs autonomous custody control over associated assets managed by said custody module, wherein:
- 13(a) the agent coordination module is configured to delegate, based on said configuration data, specific transaction authorization capabilities exclusively to the assigned RAA;
- 13(b) the custody module is configured to execute operational transactions upon receiving validated authorization mediated through the agent coordination module, said authorization contingent upon the RAA's current on-chain lifecycle status and assigned operational scope stored within said agent coordination module, and potentially current standing based on said stored performance metrics; and
- 13(c) the assigned RAA is configured to autonomously initiate and authorize operational transactions modifying asset state within the custody module, wherein said initiation and authorization are driven by the RAA seeking to optimize performance against said stored risk/return incentive structures as reflected in said target performance metrics defined in said configuration data, while adhering to said protocol rules and operational limits and constraints.

14. The system of claim 10, further configured to enable autonomous operational management via said assigned RAAs planning, coordinating, and executing tasks based on said on-chain incentives, wherein:
- 14(a) the agent coordination module is configured to store operational tasks, goals, or schedules, and said corresponding incentive rules linking rewards or penalties to said target operational performance metrics impacting risk and return;
- 14(b) the assigned RAAs are configured to detect relevant operational tasks or goals from the agent coordination module;
- 14(c) the assigned RAAs are configured to plan, coordinate, and perform, acting in accordance with the stored incentive rules to achieve said target performance metrics, an off-chain computation or operational action sequence;
- 14(d) the assigned RAAs are configured to generate said report containing results and operational performance data values corresponding to the defined metrics relative to the specific incentive rules for the completed task;
- 14(e) the processor is configured to transmit the report to the agent coordination module; and
- 14(f) the agent coordination module is configured to validate the report against the stored incentive rules, determine the corresponding reward or penalty based on validated performance data compared to said target metrics, trigger the transfer of said reward or penalty using the protocol-native stablecoin, and update the RAA's stored performance metrics based on the validated report.

15. The system of claim 10, configured to maintain an immutable record on said blockchain network encompassing key events in the assigned RAA's lifecycle and performance managed on-chain by the agent coordination module, including initial assignment, lifecycle status transitions comprising becoming Active, Suspended, or Terminated, scope updates, submitted operational reports, performance validations against said incentives, updates to said stored operational and financial performance metrics, and executed said reward or penalty transactions.

16. The system of claim 10, configured to execute a holistic risk/return management cycle wherein:
- 16(a) said processor, said AI engine, and said assigned RAAs are configured to continuously aggregate data streams including said on-chain state, market conditions, and said validated operational performance metrics stored on-chain for assigned RAAs;
- 16(b) said AI engine is configured to perform integrated analysis, synthesizing said aggregated data to assess overall risk/return profile and evaluate RAA operational actions against said configured limits and constraints and on-chain risk/return incentive rules utilizing said RAA performance metrics;
- 16(c) said AI engine is configured to determine optimal adjustments, identifying modifications to financial strategy or operational parameters, specifically by recommending changes comprising at least one of: tasks, scope, lifecycle status rules, performance metric targets, or risk/return incentive rules stored in the agent coordination module for said assigned RAAs;
- 16(d) said processor is configured to generate and transmit targeted instructions based on the determined adjustments, said instructions directed to a target selected from the group consisting of: (i) initiate direct execution by specific ones of said smart contract modules, and (ii) update said on-chain agent operational directives within the agent coordination module, including tasks, scope, status, metric targets, or incentives;
- 16(e) said smart contract modules and said assigned RAAs are configured to execute determined adjustments autonomously based on the transmitted instructions by either: (i) said specific smart contract modules performing direct execution, or (ii) said assigned RAAs adapting their operational behavior according to said updated operational directives retrieved from the agent coordination module to meet potentially revised metric targets, utilizing the protocol-native stablecoin for associated transfers; and
- 16(f) the system is configured to record outcomes, wherein recorded RAA operational performance data including said updated metrics feeds back via the processor into the data aggregation utilized in subsequent analysis cycles according to step 16(a) of this claim.

17. The system of claim 10, wherein the determination of specific transfer amounts and the automatic transfer of said protocol-native stablecoins recited in 10(f) are applied to implement automated distribution of returns, wherein said smart contract modules, processor, AI engine, or assigned RAAs are configured to detect a distribution trigger event comprising at least one of: an on-chain condition met or a validated off-chain event, and wherein the settlement module is configured to, upon said detection, determine distributable returns reflecting outcomes of AI-guided, RAA-driven operations as measured by said performance metrics, identify entitlement holders based on said ownership records, and autonomously transfer specified return amounts using the protocol-native stablecoin.

18. The system of claim 10, wherein the determination of specific transfer amounts and the automatic transfer of said protocol-native stablecoins recited in 10(f) are applied to implement autonomous settlement of fractional stakes, wherein said smart contract modules, processor, or AI engine are configured to detect a settlement trigger comprising at least one of: a predefined on-chain condition met, a validated off-chain lifecycle event, or an on-chain event triggered by the AI engine based on operational assessment, and wherein the settlement module is configured to, upon said detection, read token holder balances associated with said native asset tokens, calculate pro-rata settlement values based on ownership stake and trigger rules reflecting the state resulting from said protocol and RAA operational management including final RAA performance metrics, and autonomously transfer calculated settlement values using the protocol-native stablecoin.

* * * * *